US006660965B2

(12) United States Patent
Simpson

(10) Patent No.: US 6,660,965 B2
(45) Date of Patent: Dec. 9, 2003

(54) WELDING ASSESSMENT

(75) Inventor: Stephen Walter Simpson, Darlington (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 10/149,777

(22) PCT Filed: Dec. 15, 2000

(86) PCT No.: PCT/AU00/01550

§ 371 (c)(1),
(2), (4) Date: Sep. 23, 2002

(87) PCT Pub. No.: WO01/43910

PCT Pub. Date: Jun. 21, 2001

(65) Prior Publication Data

US 2003/0094478 A1 May 22, 2003

(30) Foreign Application Priority Data

Dec. 15, 1999 (AU) ............................................. PQ 4671
Jul. 11, 2000 (AU) ............................................. PQ 8698
Jul. 19, 2000 (AU) ............................................. PQ 8874

(51) Int. Cl.[7] ............................................... B23K 9/095
(52) U.S. Cl. .............................. 219/130.01; 219/130.33

(58) Field of Search ........................ 219/130.01, 130.21, 219/130.33, 137 PS, 109

(56) References Cited

U.S. PATENT DOCUMENTS

| 5,756,967 | A | | 5/1998 | Quinn et al. |
| 5,977,506 | A | | 11/1999 | von Daniken |
| 6,288,364 | B1 | * | 9/2001 | Simpson ................ 219/130.01 |

FOREIGN PATENT DOCUMENTS

WO    WO 98/45078    10/1998

* cited by examiner

Primary Examiner—Clifford C. Shaw
(74) Attorney, Agent, or Firm—Carol LaSalle; Bozicevic, Field & Francis LLP

(57) ABSTRACT

An apparatus and process for determining whether a fault has occurred in a welding process while the process is under way. The invention is applicable to welding and cutting processes where there is an arc plasma, such as gas-metal arc welding, tungsten-inert gas welding, pulsed welding, resistance welding and submerged welding. It involves sampling welding voltage and welding current to provide first and second signals, generating artificial third signals from these dependent on values of the first and second signals through generalised discrete point convolution operations, identifying corresponding values as triplets and collecting triplets of values into groups or regions.

36 Claims, 11 Drawing Sheets

WELDING ASSESSMENT

TECHNICAL FIELD

This invention concerns the assessment of welding. In particular it concerns an apparatus and a process for determining whether a fault has occurred in a welding process, while the process is under way. The invention is applicable to gas-metal arc welding, tungsten-inert gas welding, pulsed welding, resistance welding, submerged arc welding and to other welding and cutting processes where there is an arc plasma.

BACKGROUND ART

The study of welding and cutting arc phenomena involves observation of both voltage and current signals having periods of milliseconds to seconds, or even micro-seconds. One way of monitoring these signals involves the use of high speed photography, and another is the use of oscillograms. The limitations inherent in the observation techniques and the difficulties in analysing the resulting data, make it difficult to provide a weld quality measurement in real time.

SUMMARY OF THE INVENTION

A Single Welding Signature

The invention is an apparatus for on line welding assessment, comprising:

first sampling means to sample the welding voltage or current to provide a sequence of values for a first signal, second sampling means to sample the welding current or voltage to provide a sequence of a values of a second signal, a signal generating means to generate one or more sequences of values for one or more artificial third signals from the first signal and second signals where the artificial signals depend upon values of the first and second signals through generalised discrete point convolution operations, tripling means to identify corresponding values of the first, second and third signals, and collection means to collect triplets of values which are useful for quality monitoring into groups or regions. The triplets collected could be visualised to be those that would fall within selected regions of a three dimensional scatter plot of the values of the first, second and third signals. The regions could be drawn on to such a visualisation.

The first signal data sequence may be represented as the sequence $D_1, D_2, \ldots, D_{\eta-1}, D_\eta$, and the second signal data sequence represented as the sequence $\Gamma_1, \Gamma_2, \ldots, \Gamma_{\eta-1}, \Gamma_\eta$. The total number of data points $\eta$ must be 2 or higher and a value of 1000 may be used. The artificial sequence numbered s is the sequence $A_{1,s}, A_{2,s}, \ldots, A_{\eta-1,s}, A_{\eta,s}$. The artificial sequence number s varies from 1 to a maximum value $\sigma$, $\sigma$ must be 1 or higher and a value of 5 may be used. The member n of the artificial sequence numbered s, $A_{n,s}$, may be determined from:

$$A_{\eta,s} = \sum_{\kappa=1}^{\eta} \Psi(1, \kappa, n, s, t) D_\kappa + \Psi(2, \kappa, n, s, t) \Gamma_\kappa \quad (1)$$

The coefficients $\psi$ may depend on $\kappa$, the location of $D_\eta$ in the first signal data sequence and also the location of $\Gamma_\eta$ in the second signal data sequence: n, the location of $A_{n,s}$ in the artificial data sequence numbered s; s, the artificial sequence number; and t, the time at which $D_\eta$ and $\Gamma_\eta$ were measured with respect to some specified time origin. The artificial signal generating means applies equation (1) repeatedly to calculate all values of $A_{n,s}$ for n varying from 1 to $\eta$, and s varying from 1 to $\sigma$. A useful choice for $\psi$ is:

$$\Psi(1,\kappa,n,s,t) = e^{(\kappa-n)(\tau_0 - s\tau_1)} \ldots (\kappa-n) < 0$$

$$\Psi(1,\kappa,n,s,t) = 0 \ldots (\kappa-n) \geq 0$$

$$\Psi(2,\kappa,n,s,t) = \Theta \ldots \kappa = n$$

$$\Psi(2,\kappa,n,s,t) = 0 \ldots \kappa \neq n \quad (2)$$

In equation (2) there is no explicit dependence on t. With this choice. equation (1) is close to a convolution of the first signal with a damped or decaying exponential added to the second signal multiplied by $\Theta$. The effective damping time constant is given by $\tau_0 + \tau_1 s$. The constants $\tau_0$ and $\tau_1$ set the range covered by the time constant as s varies from 1 to $\sigma$. The constant $\Theta$ sets the amount of second signal added.

The inclusion of an explicit dependence of $\psi$ on time t or sequence number n is useful when the welding system properties are varying during the sampling for a signature. For example, in resistance spot welding, physical conditions vary substantially during one spot weld for which a single signature may be determined.

Grouping means form all possible sets of values of the type $\{D_n, s, A_{n,s}\}$, that is, sets consisting of a first signal data point $D_n$, an artificial sequence number s, and the corresponding member of the artificial sequence number s. $A_{n,s}$, n varies from 1 to $\eta$, and s varies from 1 to $\sigma$. If there is only one artificial sequence, then s is always set to 1 in the sets of values.

Collection means collect sets of values which are useful for weld monitoring into groups or regions. The sets collected could be visualised to be those that would fall within selected volumetric regions of a three dimensional scatter plot with one axis plotting the value of the first signal, a second axis plotting the sequence number of the artificial sequence, and a third axis plotting the value of the corresponding artificial signal. If there is only one artificial sequence, all points will lie in the plane defined by s=1. The boundaries of the regions could be displayed as closed surfaces on such a visualisation.

The regions need not be of equal size, and they may be smaller where population density is greatest and may be exponentially greater in dimension, in both the first and artificial signal directions, as they progress away from the region of greatest population density. Once the regions are chosen, they are fixed during the weld monitoring process. The regions selected need not be contiguous, and regions may overlap.

Each of the collected sample points that fall within a given region are accumulated in the population of that region. The region populations can be represented by a population density function $f_r$ which is the population of the region numbered r, with r varying from 1 to $\rho$.

If a given point at $\{D_n, s, A_{n,s}\}$ falls within region r, accumulation means increase the population $f_r$ by $w_r(D_n, \Gamma_n, A_{n,s}, n, s, t)$, where t is the time at which $D_n$ and $\Gamma_n$ were measured. $w_r(D_n, \Gamma_n, A_{n,s}, n, s, t)$ is the weight the point is given in region r. If $w_r$ is always one, for example, the populations are a simple count of the number of points in each region.

To produce the final adjusted region populations $p_r$, function application means apply a single valued monotonic function F to each of the $f_r$ values:

$$p_r = F(f_r) \quad (3)$$

for r=1 to ρ.

The complete set $\{p_1, p_2 \ldots p_{\rho-1}, p_\rho\}$ of the $p_r$ collected is a single welding signature.

The weight functions $w_r$ are chosen to produce a welding signature which contains as much information about the properties of the final weld as possible for a given sampling rate and size. This may be done experimentally, by trial and error adjustment or by knowledge of the physical process. Since there is some statistical noise in the sample, it is useful to choose the $w_r$ to smooth the welding signature: this may be achieved by defining overlapping regions and decreasing $w_r$ for points closer to the boundary of region r. The function F is chosen to maximise the sensitivity of the welding signature to faults in the final weld.

The inclusion of a dependence of the weights $w_r$ on the data point number n permits windowing. Weights may be reduced near the start of the data sequence at n=1 and near the end of the sequence at n=η for example.

Generating a Combined Welding Signature

For a given process, it may be desirable to generate two single welding signatures using both the current and the voltage as the first signal. For processes such as tandem arc welding, two welding voltages and two currents can be measured. In this situation also, several single welding signatures may be generated.

When several single welding signatures are required, the sampling means collects several sequences of values for first signals and second signals. If the signals are related because they come from the same physical welding system, the signals may be sampled over the same time interval.

The apparatus for generating a single welding signature is then used to generate a single signature for each of the sequences of first and second signals, giving a total of $\mu$ single signatures. There are a total of ρ[m] regions defined for the single signature in. which contains the final adjusted region populations $$\{p_1[m], p_2[m], p_3[m] \ldots p_{\rho[m]}[m]\} \quad (4)$$

m varies from 1 to $\mu$. Concatenation means then produce a combined welding signature $P_T$ by concatenating all the adjusted region populations in order from each single signature for m=1 to m=$\mu$:

$$P_T = \{p_1[1], p_2[1] \ldots p_{\rho[1]}[1], p_1[2], p_2[2] \ldots p_{\rho[\mu]}[\mu]\} \quad (5)$$

The number of elements ρ in the combined welding signature is the sum of the elements in each single signature:

$$\rho = \sum_{m=1}^{\mu} \rho[m] \quad (6)$$

The combined welding signature $P_T$ is manipulated in exactly the same way as are single signatures, and where signature is mentioned below, it refers to either a single or a combined signature.

Generating a Reference Welding Signature

The sampling means repetitively provides sequences of values and a new welding signature is produced for each sequence, or set of sequences in the case of combined signatures. Memory means retain a welding signature $H = \{h_1, h_2 \ldots h_{\rho-1}, h_\rho\}$, or a set of welding signatures collected under welding conditions expected to be satisfactory and producing a high quality weldment. This may be reference data saved for some time, or could be data collected near the start of the welding run.

In the case of robotic welding, where a series of welds is carried out under conditions which may vary, either from weld to weld or during a single weld, a series of reference signatures may be stored and recalled when needed.

Reference signatures may also be calculated continuously during welding from previous sampling. In this case the reference is a weighted average of the N signatures $H_1$, $H_2$, $H_3 \ldots H_N$ where $H_N$ is the most recent signature determined. $H_{N-1}$ is the signature determined before that and so on. The reference signature X is determined from the weighted average $$x_r = W_1 h_{1r} + W_2 h_{2r} + W_3 h_{3r} + \ldots + W_N h_{Nr} \quad (6')$$

for r=1 to ρ, $x_r$ is the adjusted region population numbered r in the reference signature X: $h_{1r}$ to $h_{Nr}$ are the adjusted region populations numbered r in the signatures $H_1$ to $H_N$ determined from previous sampling; ρ is the total number of regions in each signature: and $W_1$ to $W_N$ are the signature weighting factors. The choice of signature weighting factors $W_1$ to $W_N$ determines whether the reference X represents an average of weld signature behaviour over a relatively long period of time or represents recent welding behaviour.

The application of this approach to determining welding stability is described later.

Manipulation of Welding Signatures

Manipulation means manipulate welding signatures according to the requirements of the apparatuses described below.

When signatures are multiplied or divided by a number. it is understood that every adjusted region population in the signature should be multiplied or divided by the number to produce a new signature. Similarly when signatures are added or subtracted, the matching adjusted region populations in each signature are added or subtracted, that is, the adjusted region population numbered r in one signature is added or subtracted from the adjusted region population numbered r in the other signature for r=1, 2, 3 up to ρ.

The inner, or dot product, of any two signatures C and G is calculated as $$C \cdot G = \sum_{r=1}^{\rho} c_r \times g_r \quad (7)$$

where $c_r$ and $g_r$ are the adjusted populations of region r for signatures C and G respectively.

A normalised welding signature C' is calculated from a welding signature C as follows:

$$C' = C/(\sqrt{C \cdot C}) \quad (8)$$

Estimation of the Probability of a Measured Signature Given a Set of Reference Signatures Isotropic Reference Population The probability of a measured signature S given a measured sample of θ reference signatures $R_1$, $R_2$ to $R_\theta$, is estimated by, firstly, using the signature manipulation means to calculate the average signature M:

$$M = \left(\sum_{J=1}^{\theta} R_J\right)/\theta \tag{9}$$

Secondly, the signature manipulation means are used to estimate the variance $\zeta^2$ based on distances between signatures:

$$\zeta^2 = \left[\sum_{J=1}^{\theta}(R_J - M)\cdot(R_J - M)\right]/(\theta - 1) \tag{10}$$

In the special case when $\theta=1$, and optionally for small values of $\theta$, a value of $\zeta^2$ based on measurements made previously under similar welding conditions can be used.

Assuming a normalised population density distribution of signature distances from the average $Z(y)$, the probability $\Pi(S)$ of a signature being at the same distance as signature S or further from the average value within the reference signature population is:

$$\Pi(S) = \int_{|(S-M)\cdot(S-M)|^{1/2}/\zeta}^{v} Z(y)dy \tag{11}$$

Finally, signature manipulation means evaluate the lower limit of the integral in equation (11), and statistical evaluation means evaluate $\Pi(S)$.

$\Pi(S)$ is a convenient measure of welding consistency, $\Pi(S)$ is close to one for a measured signature at the average value and tends to zero for signatures far from the average value. Low values of $\Pi(S)$ indicate that a fault has probably occurred in the process. A value of $\Pi(S)$ less than $10^{-4}$ may be used to indicate a fault in the process. Any simple statistical distribution can be chosen for $Z(y)$. A useful choice is the Normal distribution:

$$Z(y) = \sqrt{\frac{2}{\pi}} e^{-y^2/2} \tag{12}$$

where e is the base of the natural logarithms.

Statistical Distributions with Dimension Greater than One

Since signature images contain a number of variable elements, an improved method is to use a statistical distribution with dimension d>1 and estimate the dimension d from the data.

Signature manipulation means are used to evaluate the average signature M and the variance $\zeta^2$ according to equations (9) and (10) respectively. Signature manipulation means are then used to evaluate the moment numbered J of the reference signature set $\lambda_J$:

$$\lambda_J = \left[\sum_{J=1}^{\theta}((R_J - M)\cdot(R_J - M))^{J/2}\right]/(\theta - 1) \tag{10'}$$

J should not be set to 2 since $\lambda_2=\zeta^2$ which has already been calculated, J=4 is a suitable choice.

A suitable choice for the normalised statistical distribution $Z(y,d)$ with dimension d is a many-dimension Normal distribution:

$$Z(y, d) = \frac{2d^{d/2}}{2^{d/2}\Gamma(d/2)} y^{d-1} e^{-dy^2/2} \tag{11'}$$

where $\Gamma$ is the Gamma Function [1].

Using statistical evaluation means with J=4, d can be estimated from $$d = 2/\left(\frac{\lambda_4}{\zeta^4} - 1\right) \tag{12'}$$

Once d is known, the probability $\Pi(S)$ of a signature being at the same distance as signature S or further from the average value within the reference signature population is estimated from equation (11) with the many dimension population distribution $Z(y,d)$ replacing $Z(y)$:

$$\Pi(S) = \int_{|(S-M)\cdot(S-M)|^{1/2}/\zeta}^{v} Z(y, d)dy \tag{13}$$

$\Pi(S)$ is an improved measure of welding consistency.

Non Isotropic Reference Population

Although $\Pi(S)$ of equations (11) or (13) is useful, the calculation assumes that the same distribution applies moving away in all directions in signature space from the average signature. In practice there may be correlations in the variations of elements of the signatures, and this information can be used to improve sensitivity to faults, since these will not necessarily exhibit such correlations.

To account for basic anisotropy, first it is necessary to estimate the direction in signature space $M_1$ in which the reference sample shows the greatest deviations from the average M, that is $M_1$ must maximise $$\zeta_1^2 = \left(\sum_{J=1}^{\theta}((R_J - M)\cdot M_1)^2\right)/[(\theta - 1)(M_1 \cdot M_1)] \tag{14}$$

for the measured sample of $\theta$ reference signatures $R_1$, $R_2$ to $R_\theta$, with average signature M, $\theta$ must be greater than 2.

Direction location means are used to estimate $M_1$. For a set of linearly independent reference samples, these may specify $M_1$ as a linear combination:

$$M_1 = R_1 - M + \sum_{J=2}^{\theta} \varphi_J(R_J - M) \tag{15}$$

The unknown coefficients $\phi_2$, $\phi_2$ to $\phi_\theta$ can then be found by using a numerical method to minimise $1/\zeta_1^2$. A conjugate gradient method such as the Polak-Ribiere method may be used.

Once $M_1$ is known, it is normalised to give the unit signature $M_1'$ according to equation (8).

Differences from the average are now split into components parallel and perpendicular to $M_1'$ and treated independently statistically. Because of the definition of the overall average M, necessarily the average of the components of the sample differences along $M_1'$ will equal zero.

Signature manipulation means are used to find the variance of the components parallel to $M_1'$, $\zeta_1^2$:

$$\zeta_1^2 = \left(\sum_{J=1}^{\theta} [(R_J - M) \cdot M_1']^2\right) / (\theta - 1) \quad (16)$$

Signature manipulation means are used to find the remainder of $R_j-M$ which is orthogonal to $M_1'$ for each reference signature from j=1 to j=θ

$$R_j^{[1]} = R_j - M - ((R_j - M) \cdot M_1') M_1'. \quad (17)$$

Signature manipulation means are then used to find the variance of these orthogonal remainders $(\zeta^{[1]})^2$ according to:

$$(\zeta^{(1)})^2 = \left[\sum_{J=1}^{\theta} R_J^{(1)} \cdot R_J^{(1)}\right] / (\theta - 1) \quad (18)$$

Assuming independent distributions, the combined probability Π(S) that the component of a signature's difference from the average along $M_1'$ is greater than or equal to $|(S-M)\cdot M_1'|$, and the signature's remainder orthogonal to $M_1'$ is greater than or equal to the remainder of S, is given by the product of the individual probabilities (assumed independent):

$$\Pi(S) = \int_{(|S^{(1)} \cdot S^{(1)}|)^{1.2} / \zeta^{(1)}}^{v} Z(y) dy \int_{|(S-M)| \cdot M_1 \gamma z_1}^{v} Z(y) dy \quad (19)$$

where the remainder $$S^{[1]} = S - M - ((S-M) \cdot M_1') M_1'. \quad (20)$$

When anisotropies are taken into account, the previous apparatus for the isotropic case is used up to equation (9) for determining the average signature. Then the anisotropic apparatus is employed to evaluate from equation (14) to equation (18). Finally, signature manipulation means calculate the lower limits of the integrals in equation (19) using equation (20) and statistical evaluation means evaluate Π(S) from equation (19).

Π(S) is used as previously described for isotropic reference signature distributions.

For the distribution of remainders orthogonal to $M'_1$, it is an improvement to use a many dimension distribution $Z(y,d^{[1]})$ so that equation (19) is replaced with $$\Pi(S) = \int_{(|S^{(1)} \cdot S^{(1)}|)^{1.2} / \zeta^{(1)}}^{v} Z(y, d^{(1)}) dy \int_{|(S-M)| \cdot M_1 |z_1}^{v} Z(y) dy \quad (21)$$

Using statistical evaluation means for a many-dimension Normal distribution [equation (11')], the dimension $d^{[1]}$ is estimated from $$d^{(1)} = 2 / \left(\frac{\lambda_4^{(1)}}{(\zeta^{(1)})^4} - 1\right) \quad (22)$$

where $$\lambda_4^{(1)} = \left[\sum_{J=1}^{\theta} (R_J^{(1)} \cdot R_J^{(1)})^2\right] / (\theta - 1) \quad (23)$$

Once $d^{[1]}$ is known, statistical evaluation means are used to evaluate Π(S) from equation (21), which is then used as described previously.

Apparatus for Signature Conversion to Basis Set Description

If a large number of reference signatures are used for welding consistency determination and fault detection, several potential difficulties arise:

(1) Storage of signatures in computer memory or on hard disk may become an issue (2) Calculation of inner products according to equation (7) may consume a considerable amount of time. For example, to find the direction in signature space $M_1$ in which the reference sample shows the greatest deviations from the average requires calculation of several inner products.

(3) Linear independence of the signatures cannot be guaranteed.

To overcome these difficulties, signatures may successively be represented by their coordinates in an appropriate subspace with the following modified Gram-Schmidt orthogonalization apparatus.

Suppose that a set $R_1, R_2 \ldots R_\theta$ of signatures is to be sequentially converted to a subspace description, the jth signature $R_j$ is the next to be converted, and an orthonormal basis set $B_1', B_2' \ldots B_\xi'$ has already been generated by the apparatus. Orthonormal implies that all pairs of basis signatures are orthogonal, so that:

$$B'_k \cdot B'_{k_1} = 0 \quad (24)$$

for $k=k_1$ and $k_1$ and k in the range 1 to ξ, and each value is normalised according to equation (8), so that $$B'_k \cdot B'_k = 1 \quad (25)$$

for k in the range 1 to ξ.

Signature manipulation means evaluate the next prospective basis component coming from $R_j$ as $$B_{\xi-1} = R_J - \sum_{k=1}^{\xi} (R_J \cdot B_k) B'_k \quad (26)$$

However basis addition means only accept $B_{\xi+1}$ for the basis set if it satisfies $$B_{\xi-1} \cdot B_{\xi-1} > \varepsilon^2 \left(\sum_{J_i=1}^{J} R_{J_i} \cdot R_{J_i}\right) / J \quad (27)$$

The value of ε is chosen such that $B_{\xi+1}$ will only be accepted for the basis set if it is sufficiently large. This means that if $R_j$ is not significantly linearly independent of the existing basis it will not be used to generate a new basis set signature. A value of ε which may be used is 0.001.

If $B_{\xi+1}$ is to be accepted, the normalised value $B_{\xi+1}'$ is included in the basis set, applying equation (8).

To start the process off, basis addition means always include the normalised first reference $R_1'$ as the first element of the basis set.

Finally, basis description means express $R_1$ in terms of basis set coordinates $\alpha_{j1}, \alpha_{j2}, \ldots \alpha_{j\Xi}$ in the subspace defined by the set $B_1', B_2' \ldots B_\Xi'$, where the set extends to $\Xi=\xi+1$ if $B_{\xi+1}$ was accepted and to $\Xi=\xi$ otherwise:

$$R_j = \sum_{k=1}^{\Xi} a_{jk} B'_k \qquad (28)$$

where $$a_{jk}=R_j \cdot B'_k \qquad (29)$$

When basis addition means complete the process through to $R_\theta$, the description of the reference signatures is made up of a set of $\Omega$ basis signatures $B_1', B_2' \ldots B_\Omega'$ plus a set of $\theta$ basis set coordinates with $\Omega$ values in each. If a particular basis signature does not appear in the expression for a given reference because the given basis signature was added later, the corresponding coordinate is set to zero.

This will generally be a more compact description of the welding signatures when $\theta$ is greater than about 10. For real time work, basis addition means are used with consecutive reference signatures as they are determined during welding.

Another advantage of using the basis set description is that signature manipulation can be performed more efficiently. Basis coordinate manipulation means perform the operations. Suppose C and G are signatures expressed in the basis set corresponding to the references $R_1$ to $R_\theta$ as $$C = \sum_{k=1}^{\Omega} \gamma_k B_k \qquad (30)$$

$$G = \sum_{k=1}^{\Omega} \delta_k B'_k$$

where the basis set coordinates are $$\gamma_k = C \cdot B'_k$$

$$\delta_k = G \cdot B'_k \qquad (31)$$

for $k=1$ to $k=\Omega$. The inner product is given by $$C \cdot G = \sum_{k=1}^{\Omega} \gamma_k \delta_k \qquad (32)$$

This operation only requires $\Omega$ multiplications as compared to the $\rho$ multiplications for signatures.

When signatures expressed in terms of the basis set are multiplied or divided by a number, every basis set coordinate should be multiplied or divided by the number to produce a new signature expressed in terms of the basis set. Similarly when signatures are added or subtracted, the matching coordinates for each signature are added or subtracted respectively, that is, the coordinate numbered k in one set is added or subtracted from the coordinate numbered k in the other set for k=1, 2, 3 up to $\Omega$.

Basis set descriptions cannot be applied to every measured signature. They only apply to signatures that lie in the signature subspace defined by the basis set of signatures. These signatures are the reference signatures themselves and linear combinations of the reference signatures.

Determining Welding Stability

During a welding process, a quantitative measure of what is loosely called "stability" can be very valuable. A useful measure is the variability of the welding signature, that is, is a given signature as one would expect it from the previous signatures? Suppose a sequence $H_1, H_2 \ldots H_N$ of signatures has been determined by signature generation means, with N>1. Signature manipulation means determine a simple linear prediction of the next signature X using a particular choice of signature weighting factors [equation (6')]:

$$X=2H_N-H_{N-1} \qquad (33)$$

The squared distance between the next measured signature $S_{N-1}$ and the predicted signature is $$(S_{N-1}-X) \cdot (S_{N-1}-X) \qquad (34)$$

Assuming a signature population distribution Z(y), such as the Normal distribution [equation (12)], the probability of the signature $S_{N+1}$ is calculated using statistical evaluation means from $$\Pi(S_{N+1}) = \int_{((S_{N-1}-X)\cdot(S_{N-1}-X))^{1/2}/\varsigma}^{\infty} Z(y) d y \qquad (35)$$

with $\zeta$ given a fixed value based on a reference set of signatures previously generated, using equation (10). $\Pi(S_{N+1})$ is a useful stability measure with higher probabilities indicating a more stable welding process.

If the welding process is relatively unstable. a coarser measure of stability comes from considering a larger group of signatures immediately prior to the measured signature $S_{N+1}$ as a reference set $R_1$ to $R_\theta$ and using statistical evaluation means to determine $\Pi(S_{N-1})$ from equation (11), equation (19), or equation (21)

Use of Invention

Use of the invention may allow determination of whether a fault has occurred in a welding process, while the process is under way. It may also allow determination whether a welding process is consistent and stable, while the process is under way.

In further aspects the invention, as currently envisaged. is methods of performing the steps of the processes being performed above, but without reference to any specific apparatus.

BRIEF DESCRIPTION OF THE DRAWINGS

An example of the invention will now be described with reference the accompanying drawings, in which.

List Of Symbols

Figure 1:
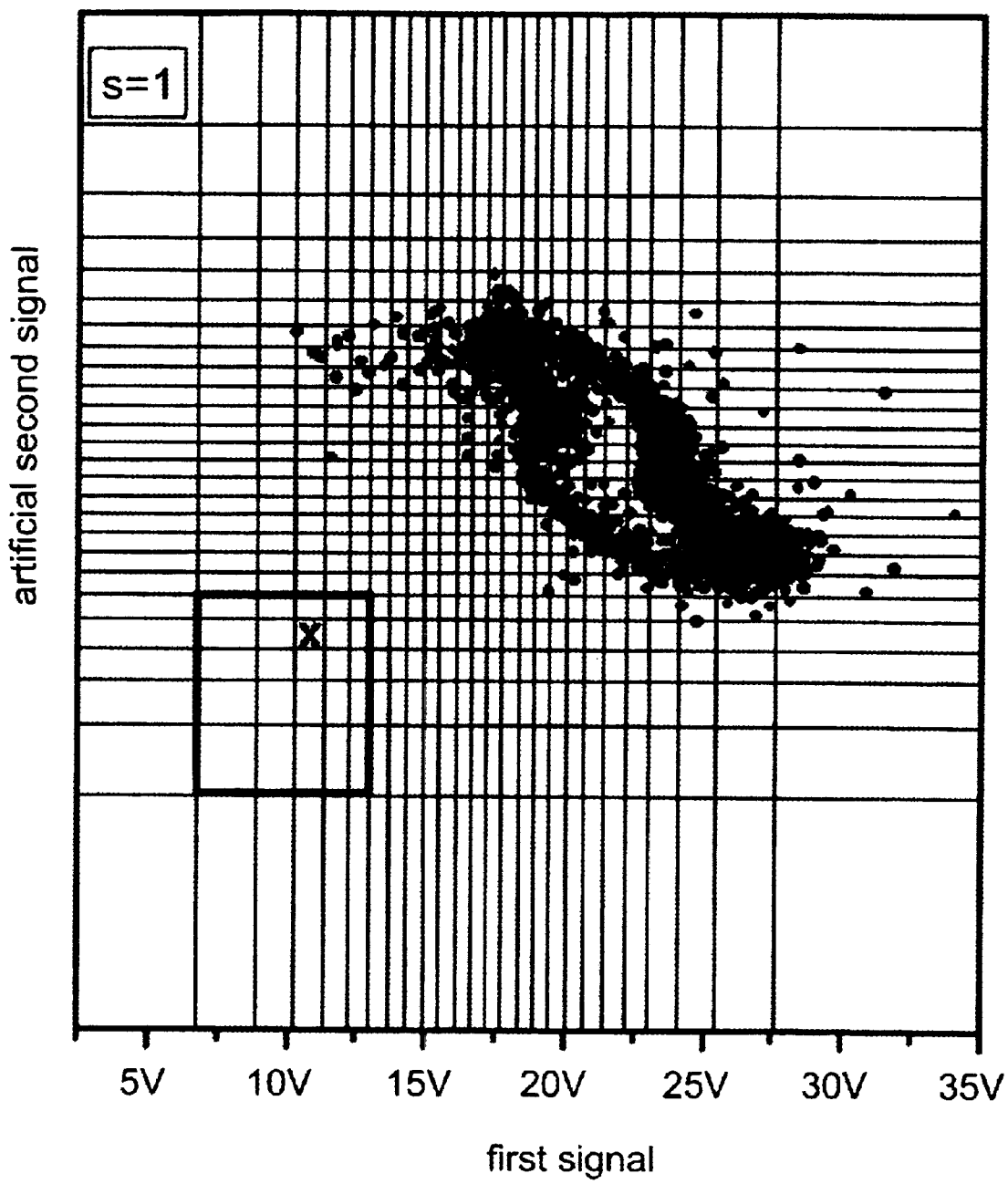
FIG. 1 is a first plane through a multi-dimensional scatter diagram showing a signature region.

α coordinates of a signature in terms of a basis set
β coefficients of basis signatures in expression for $M_1$
Γ a value of second data
γ coordinates of signature C in terms of a basis set
δ coordinates of signature G in terms of a basis set
ε minimum size parameter for basis addition
η number of first data points
θ number of signatures in a set of reference welding signatures
Θ constant in example of convolution coefficient
κ number of a first or second data value used in convolution
λ estimate of moment of a set of reference welding signatures
$λ^{[1]}$ estimate of moment for remainders for reference components
μ number of welding signatures in a set to be combined
ξ current number of signatures in a basis set
Ξ succeeding number of signatures in a basis set
Π probability
ρ number of regions in a welding signature
σ number of artificial data sequences
$ζ^2$ estimate of variance of a set of reference welding signatures
$(ζ^{(1)})^2$ estimate of variance for remainders of reference signatures
$(ζ_1)^2$ estimate of variance for reference components along anisotropy direction
$τ_0$, $τ_1$ constants in example of convolution coefficient
φ coefficients of reference signatures in expression for $M_1$
Ψ coefficient in convolution
Ω total number of signatures in a basis set
A a value of artificial data
B a welding signature in a basis set
c adjusted region population of welding signature C
C a welding signature
d dimension of a statistical distribution
$d^{[1]}$ dimension of remainders of reference signatures
D a value of first data
e base of the natural logarithms
f population of region in a welding signature
F function used to adjust population values
g adjusted region population of welding signature G
G a welding signature
h adjusted region population in a welding signature from previous sampling
H welding signature from previous sampling
j number of a signature in a set of reference welding signatures
$j_1$ number of a signature in a set of reference welding signatures
J number of moment of a set of reference welding signatures
k number of a signature in a basis set of welding signatures
$k_1$ number of a signature in a basis set of welding signatures
m number of a single welding signature in a set to be combined
M average signature for a set of reference signatures
$M_1$ direction of anisotropy of a reference set
n number of a data point in a sequence
N number of reference signatures from previous sampling
p adjusted region population in a welding signature
$P_T$ combined welding signature
r number of a region in a welding signature
R a reference welding signature
$R^{[1]}$ remainder of a reference signature
s number of an artificial data sequence
S a measured welding signature
$S^{[1]}$ remainder of a measured welding signature
t time
W weights used in determining a reference from previous sampling
w weight function used to calculate region populations
x adjusted region population in reference signature X
X a reference welding signature
y integration variable for population density distribution function
Z population density distribution function

BEST MODES FOR CARRYING OUT THE INVENTION

Generating of a Single Welding Signature

In pulsed gas-metal arc welding, pulses occur repetitively. The voltage waveforms as a result show generally rectangular pulses at about 25 volts separated by regions where the voltage falls to a lower value. This voltage is sampled to collect η=4096 points of voltage data with a time interval between sampled measurements of 61 microseconds. Three artificial second sequences are generated so that σ=3.

The member n of the artificial sequence with number s, $A_{n,s}$, is determined from the equation (1) with ψ given in equation (2), and the constants are given the values $τ_0$=2.0, $τ_1$=0.5, and Θ=0. The voltage data is the first signal data sequence $D_n$ and the second signal data sequence $Γ_n$ is not used in this example.

Figure 2:
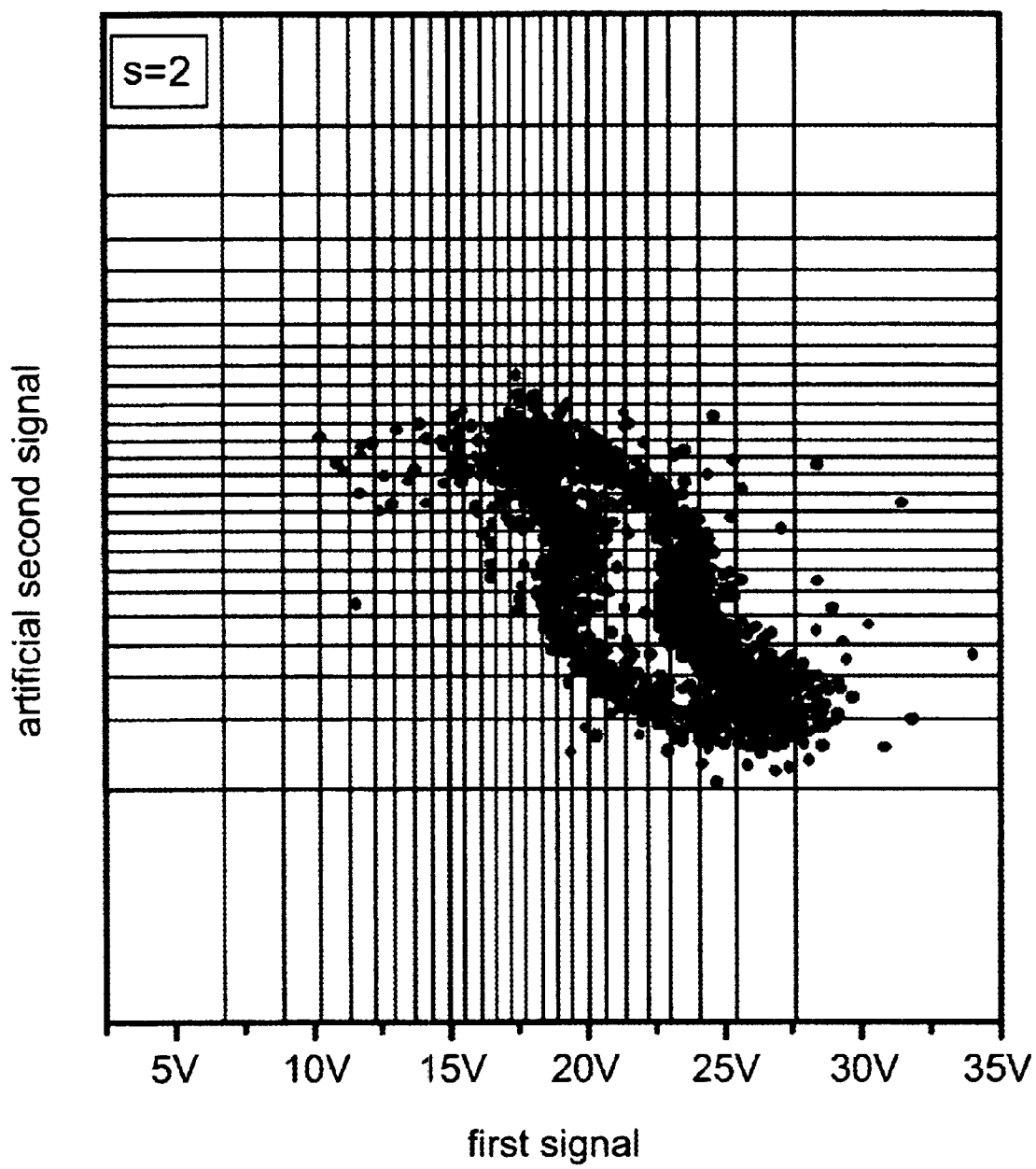
FIG. 2 is a second plane through the multi-dimensional scatter diagram.
Figure 3:
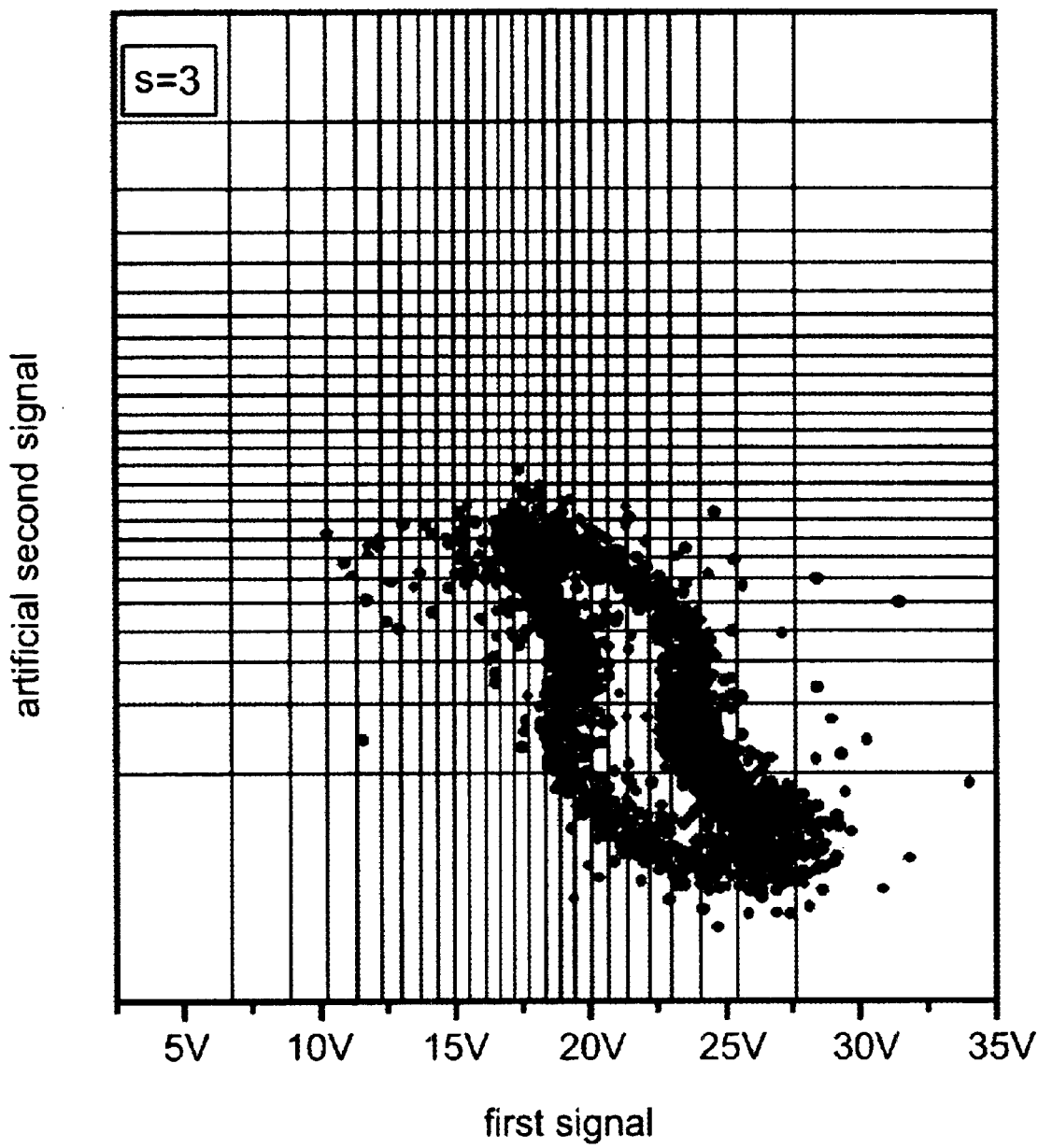
FIG. 3 is a third plane through the multi-dimensional scatter diagram.

Scatter plots of the 4096 data points in the three planes s=1, s=2, and s=3 are shown in FIGS. 1, 2 and 3. In each plane there are 25 vertical grid lines and 23 horizontal grid lines. The grid lines are not evenly spaced, but are closer together where the density of points in the s=2 plane is highest.

The grid lines divide the plane into 26×26=676 rectangles of varying sizes, which will be referred to as the grid rectangles. For each grid rectangle a rectangular region of the welding signature is defined by taking a 5×5 array of grid rectangles centred on the chosen grid rectangle. One such rectangular region is illustrated in the lower left of the s=1 plane. The "x" marks the central defining grid rectangle.

For grid rectangles at, or close to the boundaries, the rectangular regions only extend to the boundary. For this example, a total of 26×26×3=2028 overlapping regions are defined.

If a given point at $\{D_n, s, A_{n,s}\}$ falls within region r, the population $f_r$ is increased by $w_r(D_n, Γ_n, A_{n,s}, n, s, t)$. In this example, the weight given to the point is $$w_r(D_n, Γ_n, A_{n,s}, n, s, t) = e^{-25(D_n - D_r)^2 - Q39(A_{n,s} - A_r)^2} \qquad (36)$$

where $D_r$ is the value of the first variable at the midpoint of the grid rectangle defining region r and $A_r$ is the value of the artificial variable at the midpoint of the grid rectangle defining region r.

To produce the final adjusted region populations $p_r$, function application means apply a single valued monotonic function F to each of the $f_r$ values, and in this example the square root is taken $$p_r = \sqrt{f_r} \qquad (37)$$

for r=1 to 2028.

Figure 4:
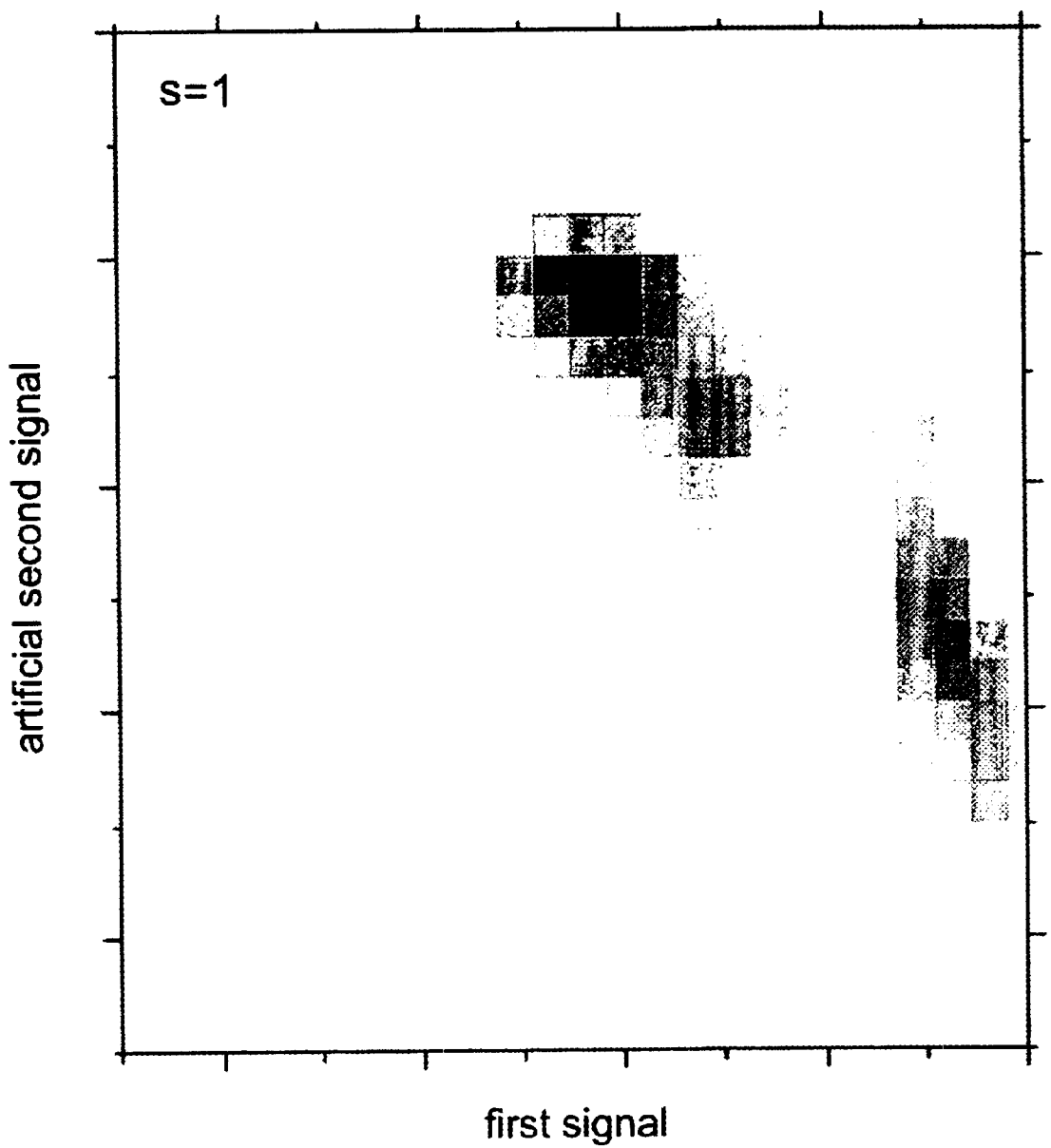
FIG. 4 is a first plane through a multi-dimensional signature density plot.
Figure 5:
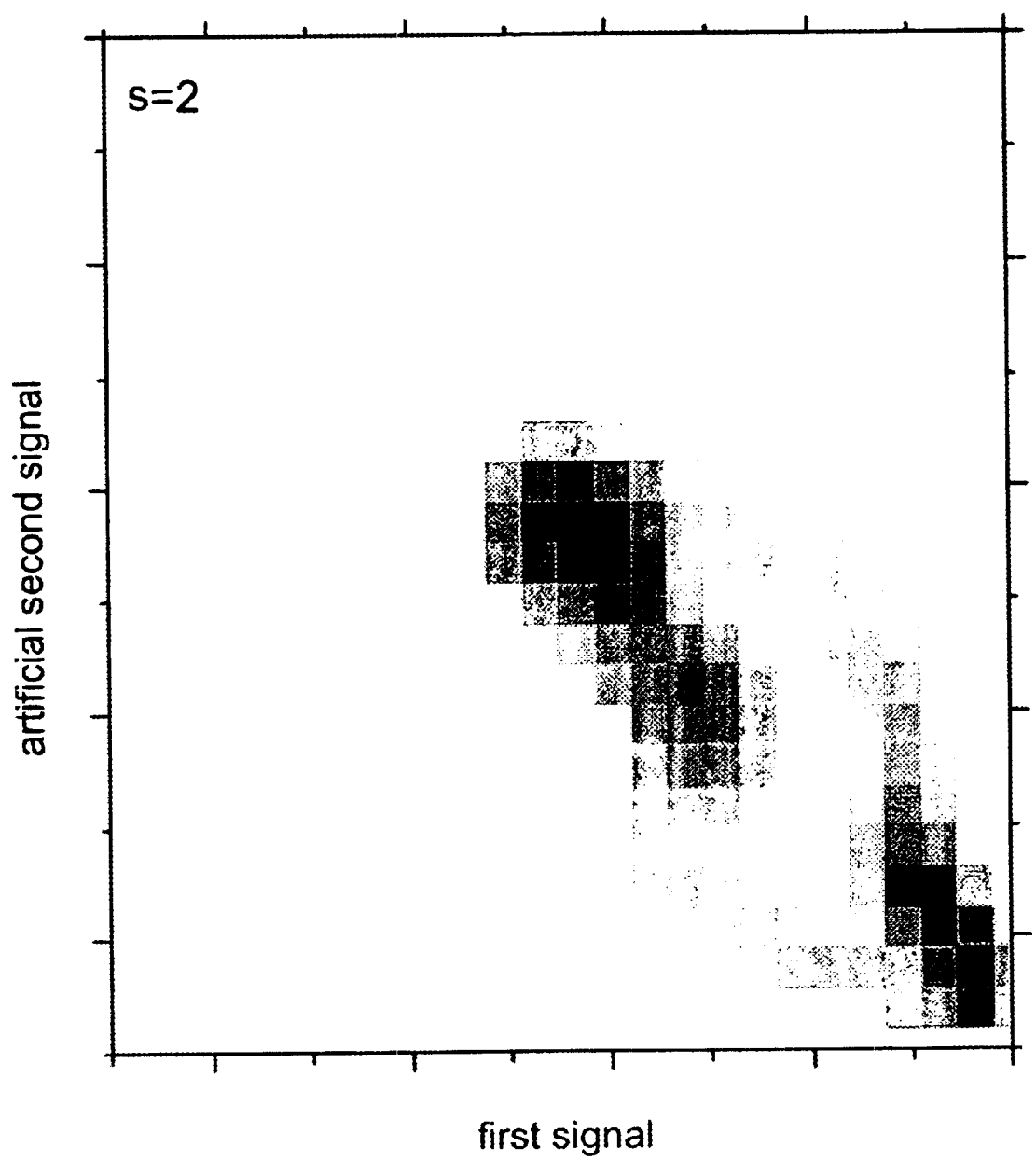
FIG. 5 is a second plane through the multi-dimensional signature density plot.
Figure 6:
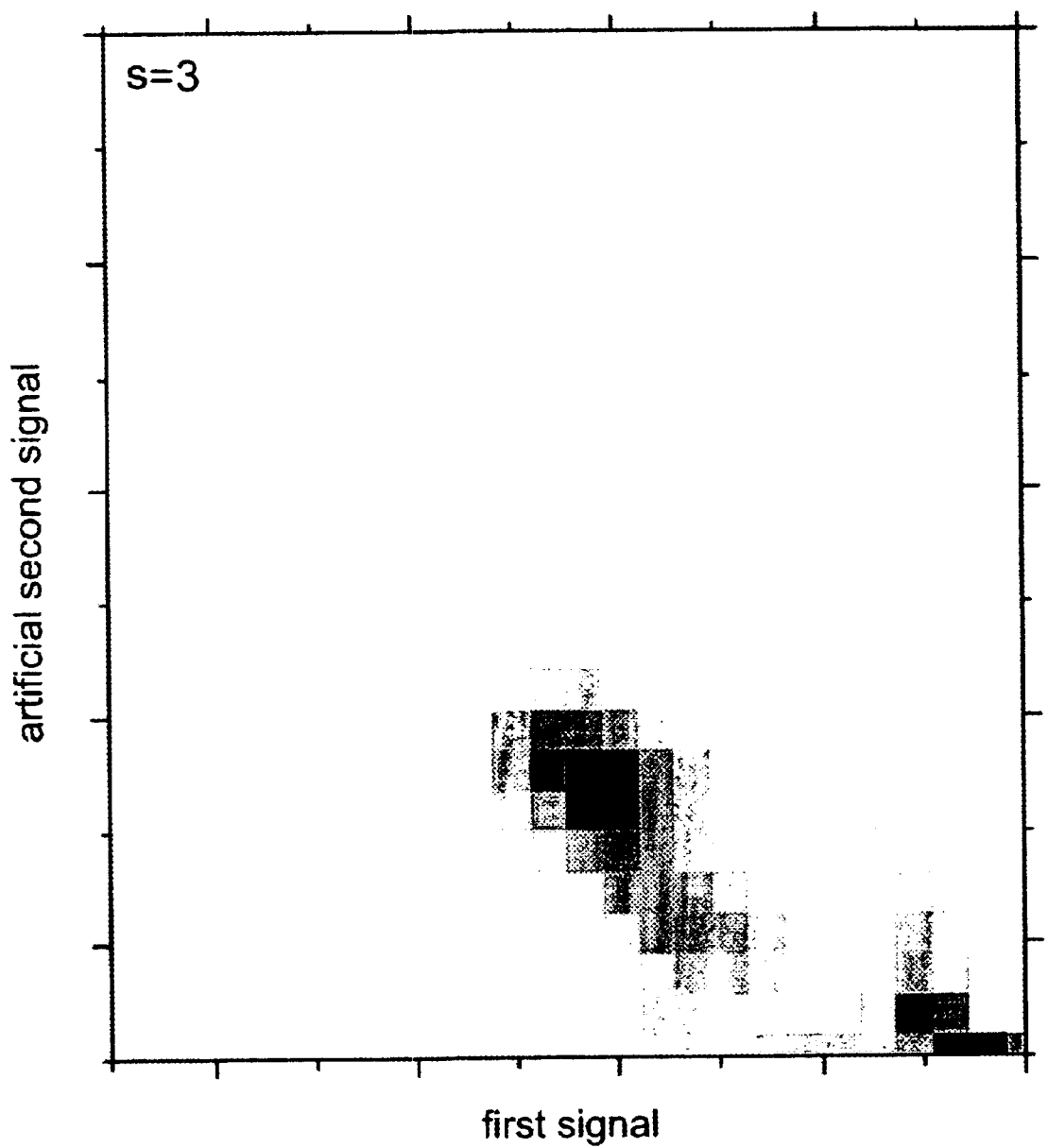
FIG. 6 is a third plane through the multi-dimensional signature density plot.

The single welding signature is illustrated in FIGS. 4, 5 and 6 in each of the three planes s=1, 2, and 3. Higher population densities are indicated by darker regions.

Example of Application of Basis Set Description for Estimation of the Probability of a Measured Signature with a Non Isotropic Reference Population Using signature image to basis set description, the set of reference functions R for j=1 to θ are expressed in terms of the basis functions and the $\alpha_{jk}$ coordinates [equation (28)]. The average signature M is also expressed in terms of the basis functions as $$M = \sum_{k=1}^{\Omega} a_k B_k \qquad (38)$$

where $$\alpha_k = M \cdot B'_k \qquad (39)$$

Instead of expressing the direction in signature space $M_1$ in which the reference sample shows the greatest deviations from the average in terms of the full set of reference functions using equation (15), it can be expressed in terms of the basis set as $$M_1 = B'_1 + \sum_{k=2}^{\Omega} \beta_k \beta_k \qquad (40)$$

It is again necessary to find the values of the unknown coefficients $\beta_2, \ldots \beta_\Omega$ to minimise $1/\zeta_1^2$, with $\zeta_1^2$ given in equation (14). A numerical technique such as Polak-Ribiere method can again be used. Once $\beta_2, \ldots \beta_\Omega$ are found, $M_1$ is known from equation (40) and it can be normalised to give the unit signature $M_1'$.

To estimate the probability of a measured signature S, differences from the average are again split into components parallel and perpendicular to $M_1'$ and treated independently statistically, according to equations (16) to (20), or alternatively equations (16), (17), (18), (21), (22) and (23). At this point the calculation proceeds as described previously.

The measured signal S cannot necessarily be expressed in terms of basis set coordinates, that is, in the subspace defined by the reference signatures. since there is no guarantee that S lies in that subspace and the inner product operations in equations (19), (20) and (21) cannot be carried out using equation (32).

Example of Generating a Basis Set and Determining the Probability of a Given Measured Signature with a Nonisotropic Reference Population In pulsed gas-metal arc welding, the voltage is sampled to collect η=8192 points of voltage data with a time interval between sampled measurements of 61 microseconds. for the first signal data sequence $D_n$. The current is sampled in a similar fashion for the second signal data sequence $\Gamma_n$. A single artificial second sequence is generated so that σ=1. The resultant signatures are two dimensional and can be readily illustrated in this example.

The member n of the artificial sequence with number 1, $A_{n,1}$, is determined from the equation (1) with ψ given in equation (2), and the constants are given the values $\tau_0$=0, $\tau_1$=2.5, and Θ=0.15. Region populations are then calculated as described in the previous example of generating a single welding signature.

A set of 12 reference signatures is produced (θ=12) and basis signatures are derived using the conversion to basis set description apparatus. In this example there are three basis signatures and Ω=3. The number of basis signatures may be higher, for example Ω=8. However the choice Ω=3 facilitates visualisation in this example using 3-dimensional diagrams.

Figure 7:
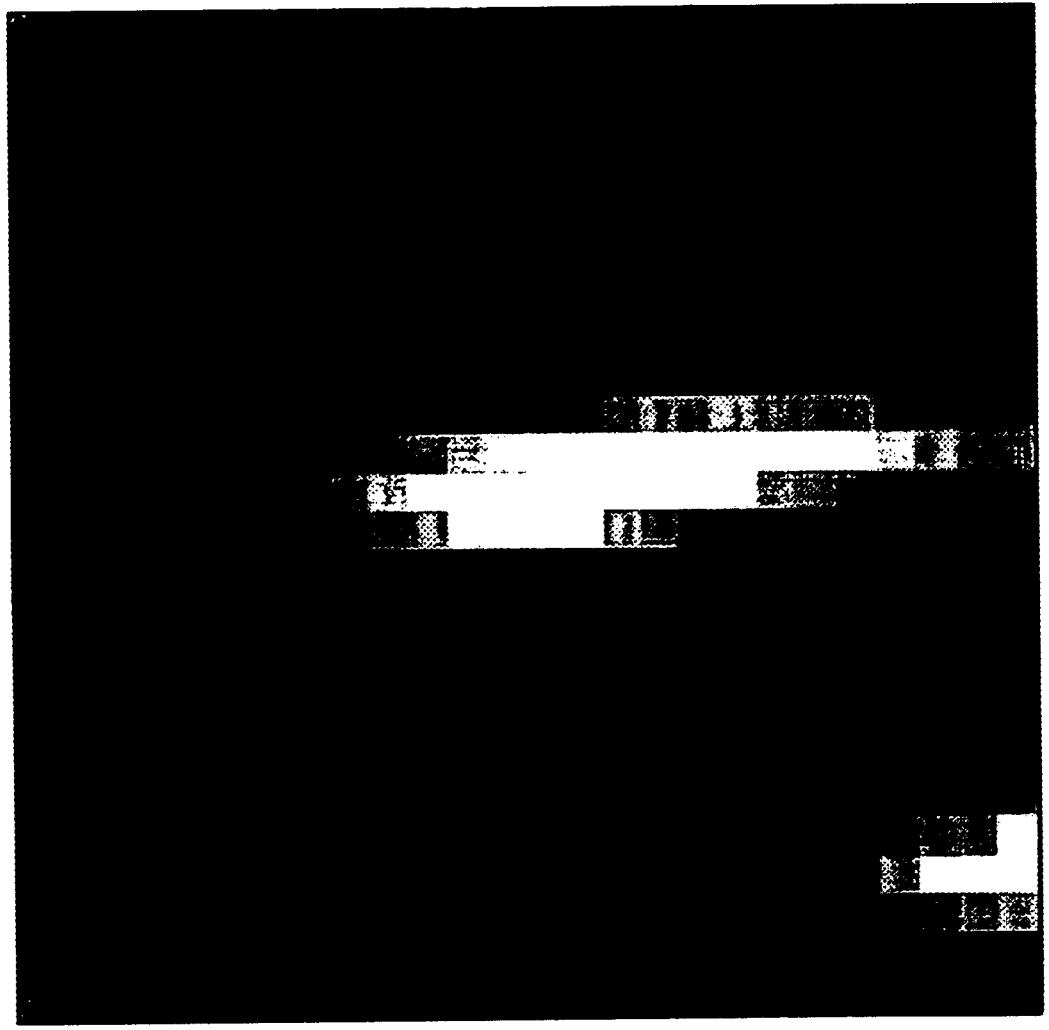
FIG. 7 shows the first of three basis signatures.
Figure 8:
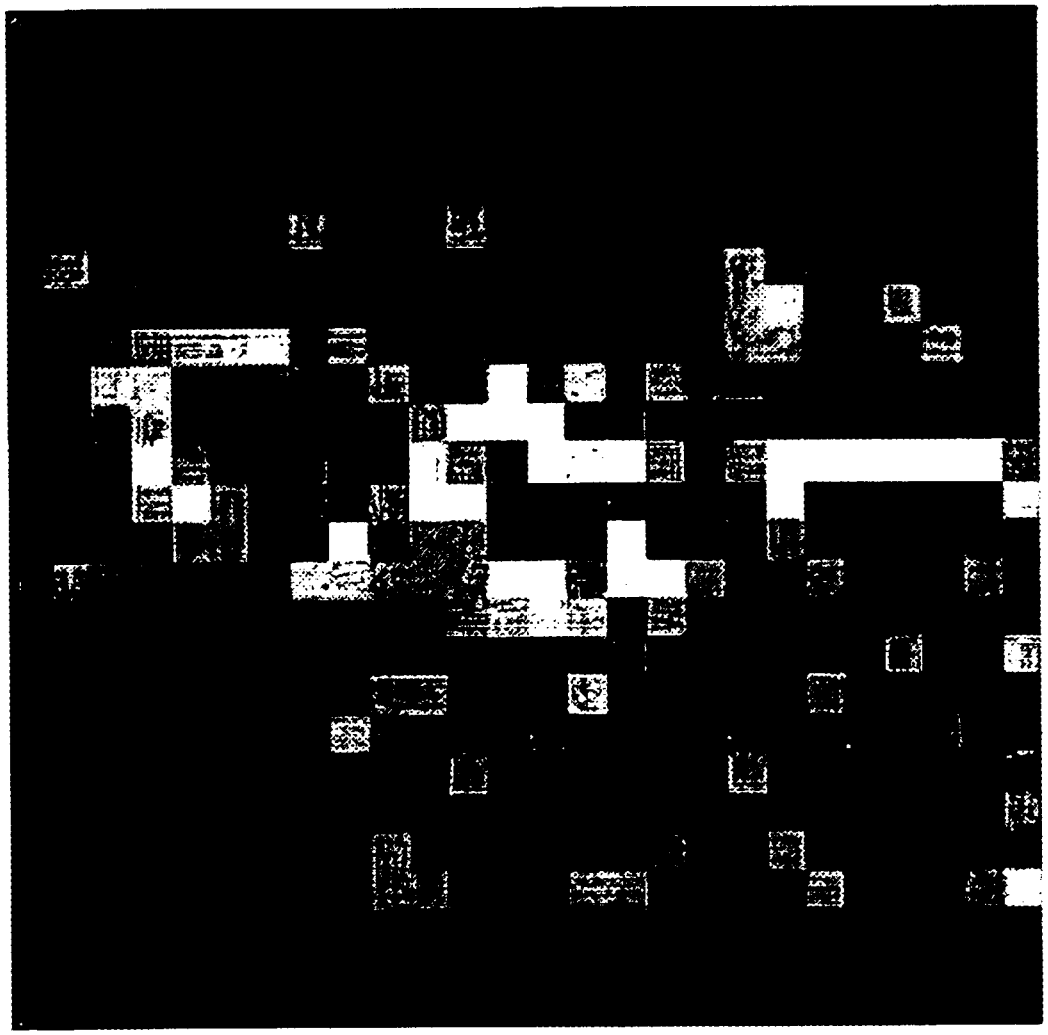
FIG. 8 shows the second of three basis signatures.
Figure 9:
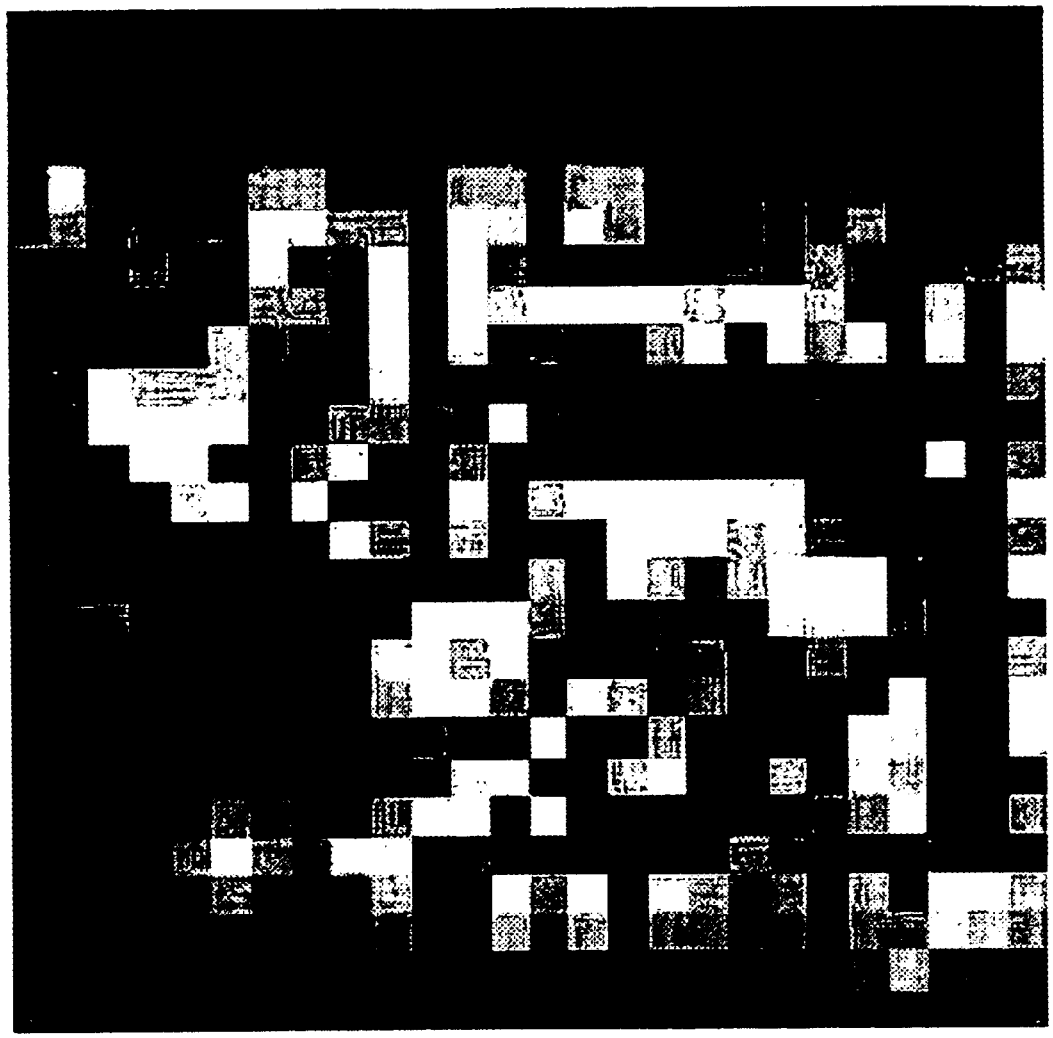
FIG. 9 shows the third of three basis signatures.

The three two-dimensional basis signatures $B_1'$, $B_2'$, and $B_3'$ are illustrated in FIGS. 7, 8 and 9 respectively. Lighter regions correspond to positive region populations and darker regions correspond to negative values. A grey colour corresponds to zero region population.

The set of reference functions $R_j$ for j=1 to 12 are expressed in terms of the basis functions and the $\alpha_{jk}$ coordinates [equation (28)] using signature manipulation means.

The average signature M is found from equation (9) using signature manipulation means and expressed in terms of the basis functions according to equations (38) and (39). The three coordinates of the average signature M are $a_1$=40.79, $a_2$=6.80 and $a_3$=1.87.

For each reference signature $R_j$, the difference from the average signature $R_j$–M is found in basis set coordinates by subtracting the coordinates of the average from the coordinates of the reference, yielding the coordinate set $\alpha_{j1}-a_1$, $\alpha_{j2}-a_2$, and $\alpha_{j3}-a_3$ for j=1 to 12. Each of these 12 differences from the average is shown as a point in FIG. 10. The three axes are the coordinates corresponding to each of the three basis vectors.

Figure 10:
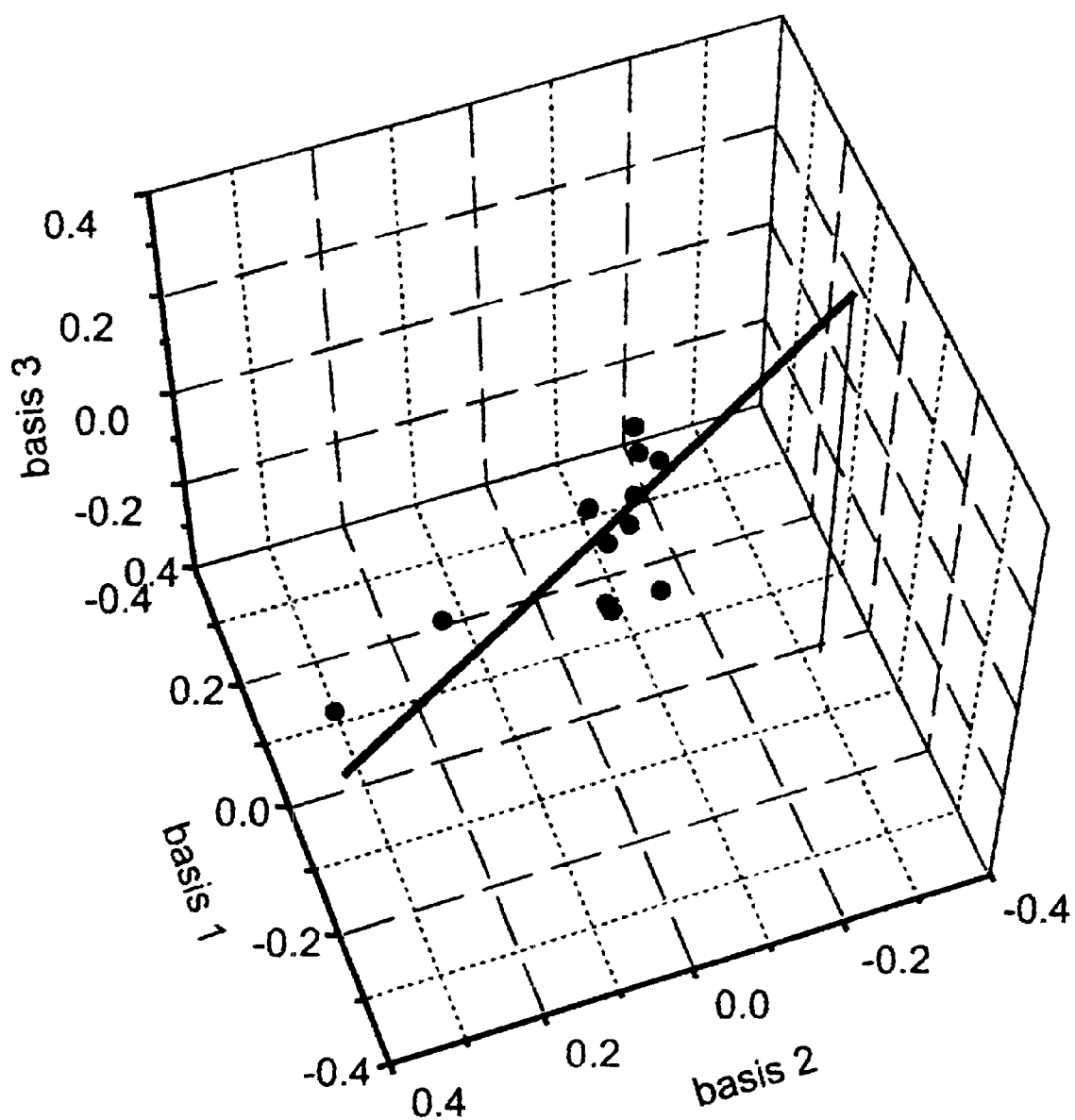
FIG. 10 shows the direction of greatest deviation from the average for a set of reference signatures.

Using equation (40) and the Polak-Ribiere method, the direction $M_1'$, in which the reference sample shows the greatest deviations from the average, can be found, The direction of $M_1'$ is illustrated as a line in FIG. 10.

The differences from the average of the reference set are split into components parallel and perpendicular to $M_1'$ and treated independently statistically, according to equations (16), (17), (18), (22) and (23). A Normal distribution [equation (12)] is used for the components parallel to $M_1'$, and a many-dimension Normal distribution is used for the perpendicular components [equation (11')]. Manipulation of signatures is done using basis coordinate manipulation means.

From equation (16), the variance parallel to $M_1'$ is found to be $\zeta_1^2$=0.0133. From equations (17), (18), (22) and (23), the variance of the orthogonal remainders $(\zeta^{[1]})^2$=0.0093 and the dimension of the distribution $d^{[1]}$ is 1.18.

Figure 11:
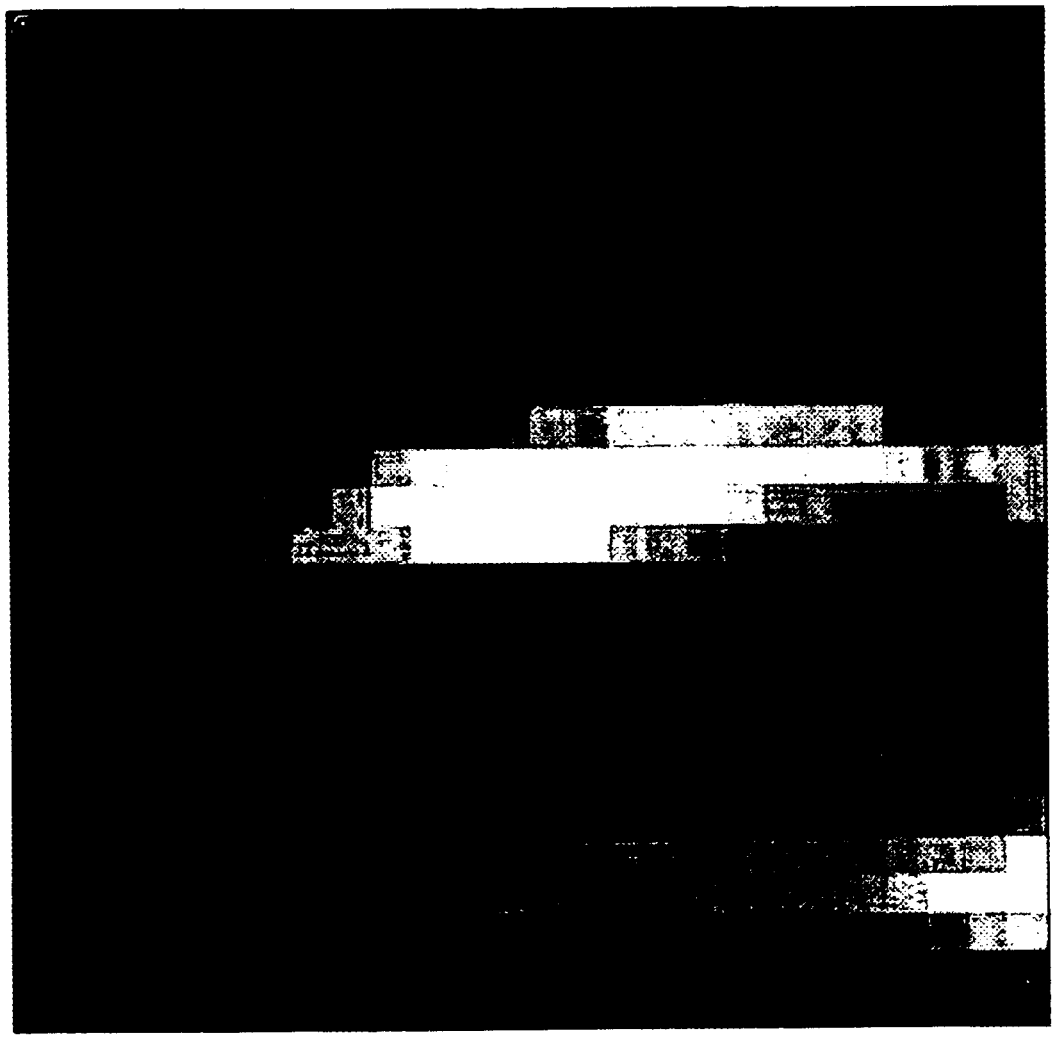
FIG. 11 shows a measured signature.

FIG. 11 shows a measured signature S. Using signature manipulation means, the remainder perpendicular to $M_1'$, $S^{[1]}$, is found from equation (20). Then statistical evaluation means and signature manipulation means are used to find the probability Π(S) from equation (21).

The integral of the Normal distribution appearing in equation (21) is an Error Function for which numerical approximations are available [1, 2]. The integral of the many-dimension Normal distribution in equation (21) is an Incomplete Gamma Function for which numerical approximations are also available [1, 2]. Statistical evaluation means employ these numerical approximations to evaluate Π(S).

In this example, Π(S) has a value of $2 \times 10^{-7}$. This low value of probability indicates that a fault has occurred.

REFERENCES

[1] Milton Abramowitz and Irene Stegun "Handbook of Mathematical Functions", Dover, N.Y. 1965, Chapter 6 and Chapter 7.

[2] William Press, Brian Flannery, Saul Teukolsky, and William Vetterling. "Numerical Recipes", Cambridge University Press, Cambridge, 1986, Chapter 6.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

This invention may also be used in other applications where there are complex repetitive electrical signals.

What is claimed is:

1. An apparatus for on line welding assessment, comprising:

first sampling means to sample the welding voltage or current to provide a sequence of values for a first signal, second sampling means to sample the welding current or voltage to provide a sequence of a values of a second signal, a signal generating means to generate one or more sequences of values for one or more artificial third signals from the first signal and second signals where the artificial signals depend upon values of the first and second signals through generalised discrete point convolution operations, tripling means to identify corresponding values of the first, second and third signals as triplets, and collection means to collect triplets of values which are useful for quality monitoring into groups or regions.

2. The apparatus according to claim 1, where the first signal is represented as the sequence $D_1, D_2, \ldots, D_{\eta-1}, D_\eta$, the second signal is represented as the sequence $\Gamma_1, \Gamma_2, \ldots, \Gamma_{\eta-1}, \Gamma_\eta$, the artificial sequence numbered s is the sequence $A_{1,s}, A_{2,s}, \ldots, A_{\eta-1,s}, A_{\eta,s}$, and the member n of the artificial sequence numbered s, $A_{n,s}$, is determined from:

$$A_{n,s} = \sum_{\kappa=i}^{\eta} \Psi(1, \kappa, n, s, t) D_\kappa + \Psi(2, \kappa, n, s, t) \Gamma_\kappa \quad (1)$$

where, the coefficients $\psi$ may depend on $\kappa$, the location of $D_\kappa$ in the first signal data sequence and also the location of $\Gamma_\kappa$ in the second signal data sequence; n, the location of $A_{n,s}$ in the artificial data sequence numbered s; s, the artificial sequence number; and t, the time at which $D_\kappa$ and $\Gamma_\kappa$ were measured with respect to some specified time origin.

3. The apparatus according to claim 2, where the artificial signal generating means applies equation (1) repeatedly to calculate all values of $A_{n,s}$ for n varying from 1 to $\eta$, and s varying from 1 to $\sigma$.

4. The apparatus according to claim 3, where $\psi$ is:

$\Psi(1,\kappa,n,s,t)=e^{(k-n)/(\tau_0+s\cdot\tau_1)} \ldots, (\kappa-n)<0$ $\Psi(1,\kappa,n,s,t)=0 \ldots, (\kappa-n) \geq 0$ $\Psi(2,\kappa,n,s,t)=\Theta \ldots, \kappa=n$ $\Psi(2,\kappa,n,s,t)=0 \ldots, \kappa \neq n$ (2).

5. The apparatus according to claim 1, where smaller regions have greatest population density, and the size of the regions increasing exponentially in both the first and artificial signal directions, as they progress away from the region of greatest population density.

6. The apparatus according to claim 5, where the region populations are represented by a population density function $f_r$ which is the population of the region numbered r, such that if a given point at $\{D_n, s, A_{n,s}\}$ falls within region r, accumulation means increase the population $f_r$ by $w_r(D_n, \Gamma_n, A_{n,s}, n, s, t)$, where t is the time at which $D_n$ and $\Gamma_n$ were measured, and $w_r(D_n, \Gamma_n, A_{n,s}, n, s, t)$ is a weight the point is given in region r.

7. The apparatus according to claim 6, where final adjusted region populations $P_r$ function application means apply a single valued monotonic function F to each of the $f_r$ values:

$$p_r = F(f_r) \quad (3)$$

and the complete set $\{p_1, p_2 \ldots p_{\rho-1}, p_\rho\}$ of the $P_r$ collected is a single welding signature.

8. The apparatus according to claim 7, where the weight functions $w_r$ are chosen by defining overlapping regions and decreasing $w_r$ for points closer to the boundary of region r, and the function F is chosen to maximise the sensitivity of the welding signature to faults in the final weld.

9. The apparatus according to claim 7, where several single welding signatures are required, the sampling means collects several sequences of values for first signals and second signals, the apparatus for generating a single welding signature is then used to generate a single signature for each of the sequences of first and second signals, and there are a total of $\rho[m]$ regions defined for the single signature m, which contains the final adjusted region populations $$\{p_1[m], p_2[m], p_3[m] \ldots p_{\rho[m]}[m]\} \quad (4).$$

10. The apparatus according to claim 9, where concatenation means then produce a combined welding signature $P_T$ by concatenating all the adjusted region populations in order from each single signature:

$$P_T = \{\rho_1[1], \rho_2[1] \ldots \rho_{\rho[1]}[1], \rho_1[2], \rho_2[2] \ldots \rho_{\rho[\mu]}[\mu]\} \quad (5).$$

11. The apparatus according to claim 10, where reference signatures are calculated continuously during welding from previous sampling, the reference is a weighted average of the N signatures $H_1, H_2, H_3, \ldots, H_N$ where $H_N$ is the most recent signature determined, $H_{N-1}$ is the signature determined before that and so on, and the reference signature X is determined from the weighted average $$x_r = W_1 h_{1r} + W_2 h_{2r} + W_3 h_{3r} + \ldots + W_N h_{Nr} \quad (6')$$

for r=1 to $\rho$, $x_r$ is the adjusted region population numbered r in the reference signature X; $h_{1r}$ to $h_{Nr}$ are the adjusted region populations numbered r in the signatures $H_1$ to $H_N$ determined from previous sampling; $\rho$ is the total number of regions in each signature; and $W_1$ to $W_N$ are the signature weighting factors.

12. The apparatus according to claim 10, where the inner, or dot product, of any two signatures C and G is calculated as $$C \cdot G = \sum_{r=1}^{p} c_r \times g_r \quad (7)$$

where $c_r$ and $g_r$ are the adjusted populations of region r for signatures C and G respectively.

13. The apparatus according to claim 12, where a normalised welding signature C' is calculated from a welding signature C as follows:

$$C' = C/(\sqrt{\sqrt{C \cdot C}}) \quad (8).$$

14. The apparatus according to claim 12, where a measure of welding consistency is given by the probability:

$$\Pi(S) = \int_{((S-M \cdot S-M))^{1/2}/\varsigma}^{\infty} Z(y) dy \qquad (11)$$

where Z(y) is a simple statistical distribution, S is a measured signature. M is an average reference signature, and $\zeta^2$ is an estimate of the variance of a set of reference welding signatures.

15. The apparatus according to claim 12, where a measure of welding consistency is given by the probability:

$$\Pi(S) = \int_{((S-M=S-M))^{1/2}/\varsigma}^{\infty} Z(y, d) dy \qquad (13)$$

where Z(y,d) is a many-dimension statistical distribution, with estimated dimension d, S is a measured signature, M is an average reference signature, and $\zeta^2$ is an estimate of the variance of a set of reference welding signatures.

16. The apparatus according to claim 10, where to account for basic anisotropy, first it is necessary to estimate the direction in signature space in which the reference sample shows the greatest deviations from the average, then differences from the average are split into components parallel and perpendicular to that direction and treated independently statistically.

17. The apparatus according to claim 10, where signatures are successively represented by their coordinates in an appropriate subspace with a modified Gram-Schmidt orthogonalization apparatus.

18. Apparatus according to claim 10, where a quantitive measure of "stability" is the variability of the welding signature.

19. A method for on line welding assessment, comprising the following steps:
   sampling the welding voltage or current to provide a sequence of values for a first signal,
   sampling the welding current or voltage to provide a sequence of a values of a second signal,
   generating one or more sequences of values for one or more artificial third signals from the first signal and second signals where the artificial signals depend upon values of the first and second signals through generalized discrete point convolution operations,
   identifying corresponding values of the first, second and third signals as triplets, and
   collecting triplets of values into regions which are useful for quality monitoring.

20. The method according to claim 19, further comprising the step of: determining the member n of the artificial sequence numbered s, $A_{n,s}$, from:

$$A_{n,s} = \sum_{\kappa=1}^{\eta} \Psi(1, \kappa, n, s, t) D_\kappa + \Psi(2, \kappa, n, s, t) \Gamma_\kappa \qquad (1)$$

where the first signal is represented as the sequence $D_1, D_2, \ldots, D_{\dot{E}}-1, D_{\dot{E}}$, the second signal is represented as the sequence $\Gamma_1, \Gamma_2, \ldots, \Gamma_{\eta-1}, \Gamma_\eta$, the artificial sequence numbered s is the sequence $A_{1,s}, A_{2,s}, \ldots, A_{\eta-1,s}, A_{\eta,s}$, and where the coefficients $\psi$ may depend on $\kappa$, the location of $D_\kappa$ in the first signal data sequence and also the location of $\Gamma_\kappa$ in the second signal data sequence; where n is the location of $A_{n,s}$ in the artificial data sequence numbered s; where s is the artificial sequence number; and where t is the time at which $D_\kappa$ and $\Gamma_\kappa$ were measured with respect to some specified time origin.

21. The method according to claim 20, further comprising the step of: applying equation (1) repeatedly to calculate all values of $A_{n,s}$ for n varying from 1 to $\eta$, and s varying from 1 to $\sigma$.

22. The method according to claim 20, where $\psi$ is:

$$\Psi(1,\kappa,n,s,t) = e^{(k-n)/(\tau_0 + s \cdot \tau_1)} \ldots, (\kappa-n) < 0$$

$$\Psi(1,\kappa,n,s,t) = 0 \ldots, (\kappa-n) \geqq 0$$

$$\Psi(2,\kappa,n,s,t) = \Theta \ldots, \kappa = n$$

$$\Psi(2,\kappa,n,s,t) = 0 \ldots, \kappa \neq n \qquad (2).$$

23. The method according to claim 19, further comprising the step of: collecting triplets into regions of various sizes, where population density is greatest in the smaller regions, and the size of the regions increases exponentially in both the first and artificial signal directions, as they progress away from the region of greatest population density.

24. The method according to claim 23, further comprising the step of: representing the region populations by a population density function $f_r$ which is the population of the region numbered r, such that if a given point at $\{D_n, s, A_{n,s}\}$ falls within region r, accumulation means increase the population $f_r$ by $w_r(D_n, \Gamma_n, A_{n,s}, n, s, t)$, where t is the time at which $D_n$ and $\Gamma_n$ were measured, and $w_r(D_n, \Gamma_n, A_{n,s}, n, s, t)$ is a weight the point is given in region r.

25. A method according to claim 24, comprising the step of: final adjusted region populations $p_r$ function application means applying a single valued monotonic function F to each of the $f_r$ values:

$$p_r = F(f_r) \qquad (3).$$

26. The method according to claim 25, further comprising the step of: choosing the weight functions $w_r$ by defining overlapping regions and decreasing $w_r$ for points closer to the boundary of region r, and choosing the function F to maximise the sensitivity of the welding signature to faults in the final weld.

27. The method according to claim 25, where several single welding signatures are required, and the sampling means collects several sequences of values for first signals and second signals, generating a single signature for each of the sequences of first and second signals, where a total of $\rho[m]$ regions are defined for the single signature m, which contains the final adjusted region populations $$\{p_1[m], p_2[m], p_3[m] \ldots p_{\rho[m]}[m]\} \qquad (4).$$

28. The method according to claim 27, further comprising the step of: producing a combined welding signature $P_T$ by concatenating all the adjusted region populations in order from each single signature:

$$P_T = \{p_1[1], p_2[1] \ldots p_{\rho[1]}[1], p_1[2], p_2[2] \ldots p_{\rho[\mu]}[\mu]\} \qquad (5).$$

29. The method according to claim 28, further comprising the step of: calculating reference signatures continuously during welding from previous sampling, where the reference is a weighted average of the N signatures $H_1, H_2, H_3 \ldots H_N$ where $H_N$ is the most recent signature determined, $H_{N-1}$ is the signature determined before that and so on, and the reference signature X is determined from the weighted average $$x_r = W_1 h_{1r} + W_2 h_{2r} + W_3 h_{3r} + \ldots + W_N h_{Nr} \quad (6')$$

for r=1 to ρ where $X_r$ is the adjusted region population numbered r in the reference signature X; $h_{1r}$ to $h_{Nr}$ are the adjusted region populations numbered r in the signatures $H_1$ to $H_N$ determined from previous sampling; ρ is the total number of regions in each signature; and $W_1$ to $W_N$ are the signature weighting factors.

30. The method according to claim 28, further comprising the step of: calculating the inner, or dot product, of any two signatures C and G as $$C \cdot G = \sum_{r=1}^{p} c_r \times g_r \quad (7)$$

where $c_r$ and $g_r$ are the adjusted populations of region r for signatures C and G respectively.

31. The method according to claim 30, further comprising the step of: calculating a normalized welding signature C' from a welding signature C as follows:

$$C' = C/(\sqrt{\sqrt{C \cdot C}}) \quad (8)$$

32. The method according to claim 30, further comprising the step of: giving a measure of welding consistency by the probability:

$$\prod (S) = \int_{((S-M \bullet (S-M))^{1/2}/\varsigma}^{y} Z(y) dy \quad (11)$$

where Z(y) is a simple statistical distribution, S is a measured signature, M is an average reference signature, and $\varsigma^2$ is an estimate of the variance of a set of reference welding signatures.

33. The method according to claim 30, further comprising the step of: giving a measure of welding consistency by the probability:

$$\prod (S) = \int_{((S-M \bullet (S-M))^{1/2}/\varsigma}^{y} Z(y, d) dy \quad (13)$$

where Z(y,d) is a many-dimension statistical distribution, with estimated dimension d, S is a measured signature, M is an average reference signature, and $\varsigma^2$ an estimate of the variance of a set of reference welding signatures.

34. The method according to claim 28, estimating the direction in signature space in which the reference sample shows the greatest deviations from the average, then splitting differences from the average into components parallel and perpendicular to the direction and treated independently statistically.

35. The method according to claim 28, further comprising the step of: successively representing signatures by their coordinates in an appropriate subspace with a modified Gram-Schmidt orthogonalization apparatus.

36. The method according to claim 28, further comprising the step of: giving a quantitative measure of "stability" as the variability of the welding signature.

* * * * *